United States Patent
Way

Patent Number: 5,558,183
Date of Patent: Sep. 24, 1996

[54] DISK BRAKE

[75] Inventor: Ashley Way, Leamington Spa, Great Britain

[73] Assignee: Automotive Products, plc, Leamington Spa, United Kingdom

[21] Appl. No.: 343,523

[22] PCT Filed: Mar. 18, 1994

[86] PCT No.: PCT/GB94/00565

§ 371 Date: Nov. 17, 1994

§ 102(e) Date: Nov. 17, 1994

[87] PCT Pub. No.: WO94/21937

PCT Pub. Date: Sep. 29, 1994

[30] Foreign Application Priority Data

Mar. 19, 1993 [GB] United Kingdom .................... 9305795

[51] Int. Cl.[6] .................................................. F16D 55/02
[52] U.S. Cl. ........................... 188/71.6; 188/264 D; 188/264 CC; 188/264 P
[58] Field of Search ....................... 188/71.6, 264 D, 188/264 CC, 264 AA, 264 P, 264 F, 246 A

[56] References Cited

U.S. PATENT DOCUMENTS

| | | | |
|---|---|---|---|
| 3,850,267 | 11/1974 | Odier | 188/264. AA X |
| 4,799,575 | 1/1989 | Kroniger | 188/71.6 |
| 5,002,160 | 3/1991 | Weiler et al. | 188/71.6 |
| 5,394,963 | 3/1995 | Deane et al. | 188/71.6 X |
| 5,445,242 | 8/1995 | Pogorzelski et al. | 188/71.6 |

FOREIGN PATENT DOCUMENTS

| | | | |
|---|---|---|---|
| 1159572 | 6/1958 | France . | |
| 1361167 | 4/1964 | France . | |
| 1903437 | 8/1970 | Germany | 188/71.6 |
| 3007240 | 9/1981 | Germany . | |
| 3714228 | 11/1988 | Germany . | |
| 3732303 | 4/1989 | Germany . | |
| 60-69335 | 4/1985 | Japan . | |
| 62-278330 | 12/1987 | Japan . | |
| 2-159431 | 6/1990 | Japan | 188/71.6 |
| 6-81867 | 3/1994 | Japan | 188/264 D |
| 6-81865 | 3/1994 | Japan | 188/264 D |

*Primary Examiner*—Lee Young
*Attorney, Agent, or Firm*—Paul E. Milliken; Lee A. Germain

[57] ABSTRACT

A disc brake caliper which includes a cooling fluid gallery which at least partially surrounds at least one of the brake operating piston and cylinder assemblies to cool the hydraulic fluid of any such assemblies. The gallery is constructed to provide thin side walls for piston and cylinder assemblies to maximize the cooling of the assemblies.

4 Claims, 4 Drawing Sheets

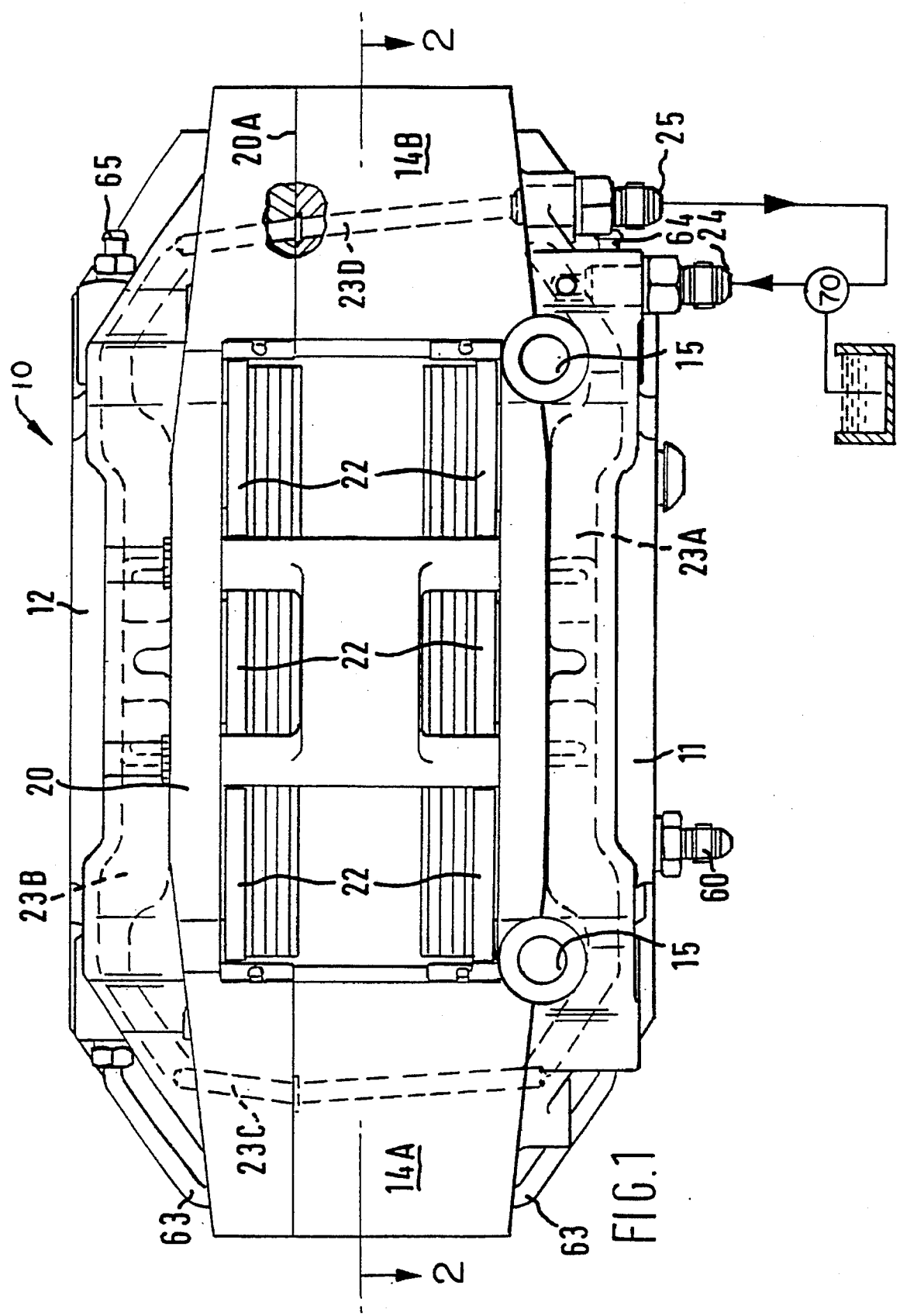

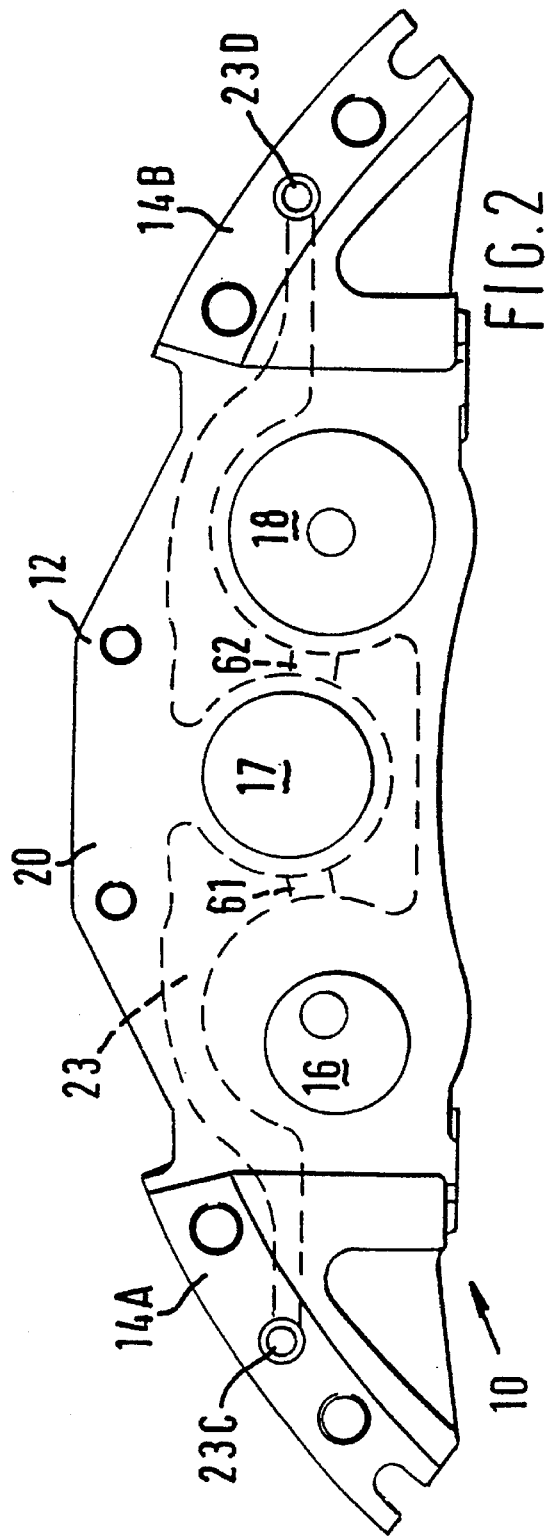
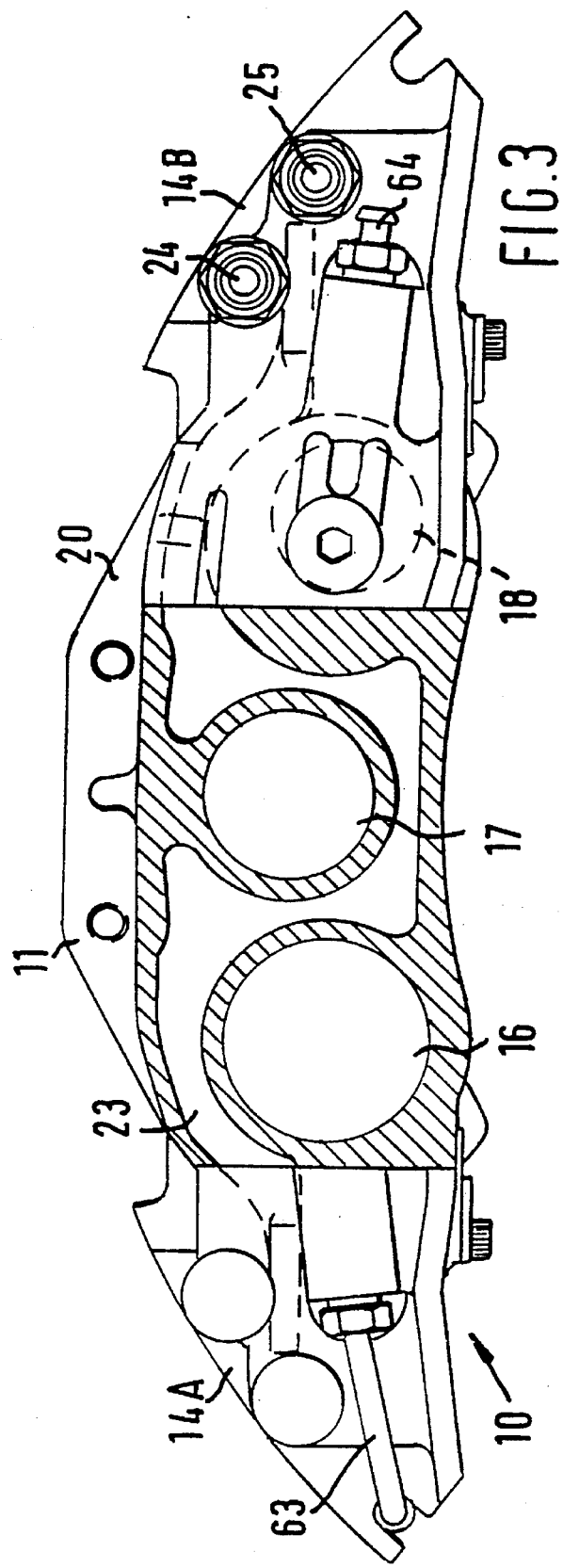

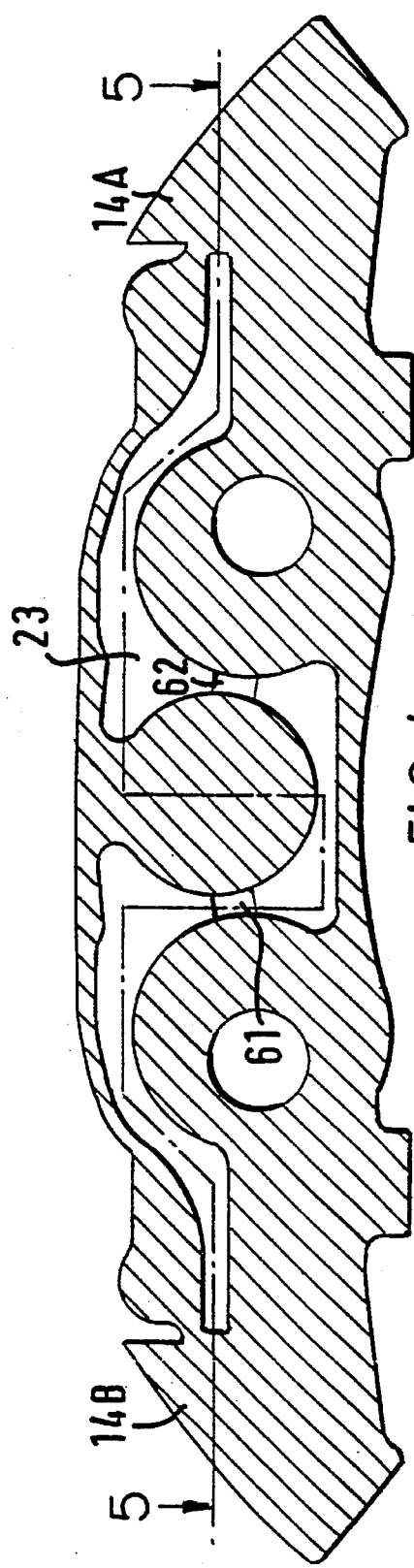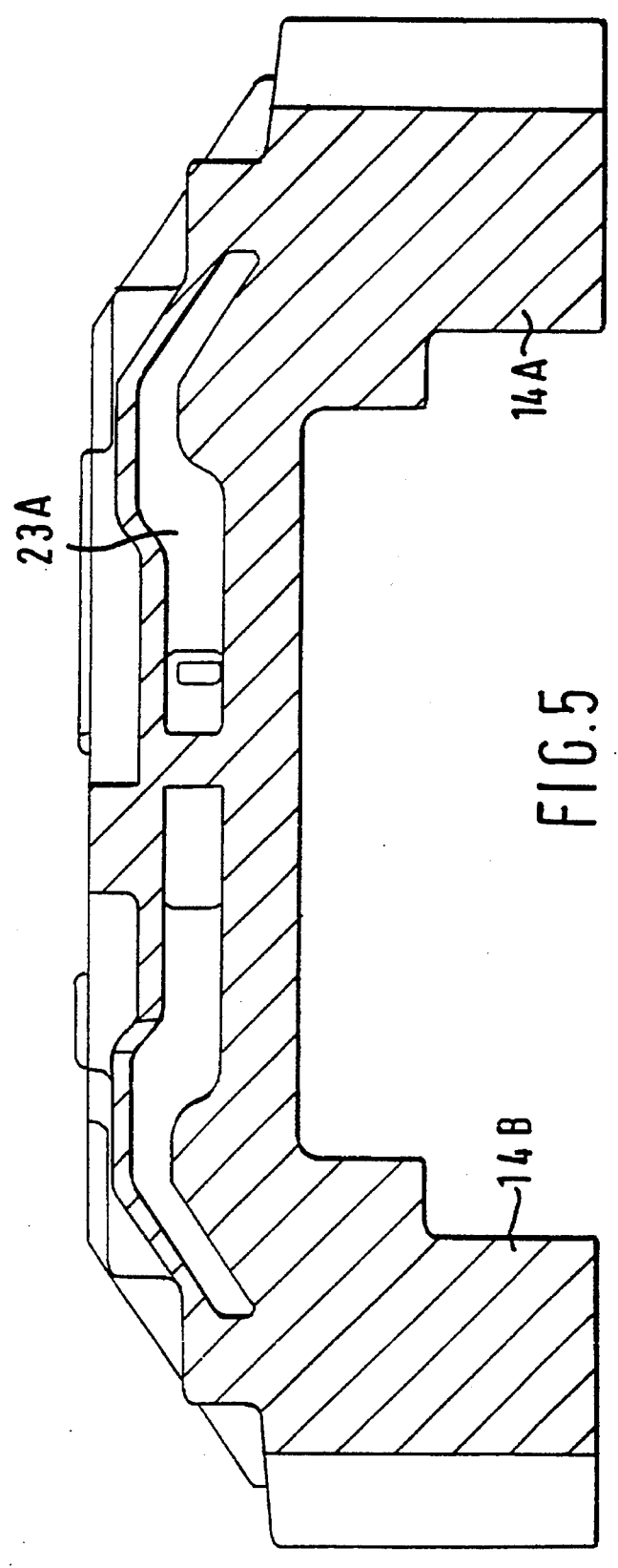
FIG. 4
FIG. 5

DISK BRAKE

This invention relates to disc brakes for motor vehicles and in particular but not exclusively to disc brakes for high performance cars.

In a typical disc brake, a brake caliper straddles the outer peripheral margin of a brake disc, the caliper having at least one hydraulic cylinder therein for applying friction pads to each side of the disc. The calipers are of two basic types, fixed calipers which have hydraulic cylinders on both sides of the disc, and moving calipers in which typically the hydraulic cylinder is on one side of the disc for direct application of friction pad(s) on that side of the disc, and the friction pad(s) on the other side of the disc are applied by the reaction movement of the caliper.

With disc brakes of the type fitted to motor cars the friction pads engage opposed sectors of the disc over arcs of varying circumferential extent depending upon the braking requirements. When the brakes are applied, the pads grip onto the disc and friction heat is generated so that the brake disc can become red hot. In extreme applications, such as in racing cars, the calipers themselves may become overheated which can cause boiling of the hydraulic brake fluid.

It is an object of the present invention to provide an improved form of disc brake caliper in which problems of overheating are mitigate.

Thus according to the present invention there is provided a disc brake caliper having two limbs which in use straddle a brake disc to support friction pads on each side of a brake disc for engagement with opposed sectors of the disc, and at least one of said limbs housing at least one hydraulic piston and cylinder assembly for operation of the brake, said caliper being characterised in that said at least one limb includes a cooling fluid passageway which at least partially surrounds the or each piston and cylinder assembly to cool the hydraulic fluid of the assembly.

Each limb of the caliper may house at least one piston and cylinder assembly which is at least partially surrounded by a cooling fluid passageway.

The or each fluid passageway may be formed as an internal gallery with at least partially encircles the side wall of the or each assembly to improve heat transfer from the or each assembly to coolant fluid within the gallery.

Conveniently the two caliper limbs are joined by circumferentially spaced bridges which pass over the outer periphery of the brake disc, and the fluid passageways in the two limbs are interconnected by passage means in either or each bridge.

The preferred coolant is water which may be circulated through the passageways by means of a pump.

The invention also provides a method of casting a disc brake caliper or caliper part which includes at least one operating piston bore, said method being characterised by comprising the steps of forming a female mould impression of the required external shape of the caliper or caliper part in a casting medium, forming a male core shaped to define a cooling gallery which at least partially surrounds the region of the caliper or caliper part which is to include the or each piston bore, supporting the core in the correct relationship relative to the mould impression to provide the desired cooling gallery, pouring a casting material into the mould void formed between the impression and core, allowing the casting material to solidify, removing the cast caliper or caliper part from the mould impression, and removing the core from within the cast caliper or caliper part.

The invention will be described by way of example and with reference to the accompanying drawings in which:

FIG. 1 is a plan view of a disc brake caliper according to the present invention;

FIG. 2 is a radial cross section through disc brake caliper of FIG. 1 taken on the line 2—2 with pistons and pads removed;

FIG. 3 is a side elevation, partly in section, of the caliper of FIG. 1;

FIG. 4 is a radial cross section through a casting from which one caliper limb is formed;

FIG. 5 is a section on the line 5—5 of FIG. 4;

Figure 6:
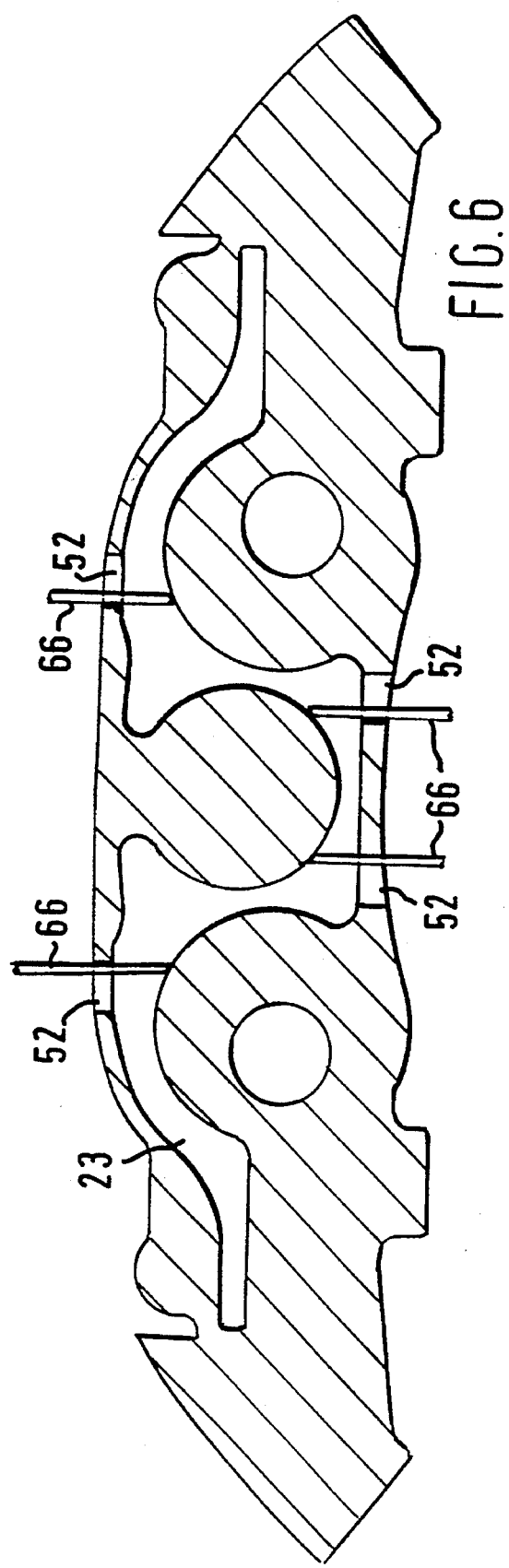
Figure 7:
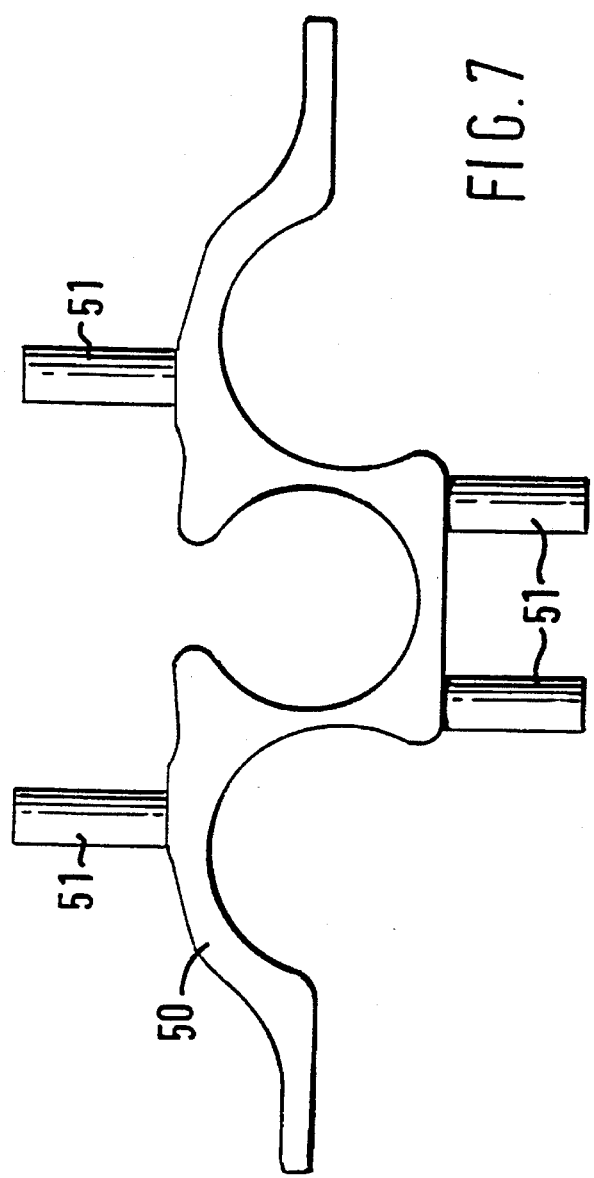

FIG. 6 is a radial section, corresponding to FIG. 4 showing core retaining holes, and FIG. 7 is a side elevation of a core used in the casting of the caliper limb shown in section in FIG. 4, With reference to FIGS. 1 to 3 there is illustrated a disc brake caliper 10 for a racing car and which comprises a two-piece caliper body 20 having two limbs 11, 12 interconnected by two spaced bridge portions 14A, 14B which join at interface 20A. In use the caliper body 20 straddles a brake disc (not shown) with a limb located on each side of the disc. One limb 11 is connected in use to a torque reaction member e.g. a stub axle to which the braking loads are transferred, through fastening holes 15 in the caliper body.

The two limbs 11 and 12 each have three hydraulic cylinder/piston assemblies 16, 17, 18 circumferentially spaced across the caliper body (that is circumferentially with respect to the disc) so that the cylinder assemblies 16,17,18 in one limb 11 oppose the cylinder assemblies in the other limb 12. The cylinders each contain pistons which thrust friction pads 22 against the opposed surfaces of the disc.

The pads 22 may comprise a single arcuate pad on each side of the disc or may comprise a plurality of pads 22 on each side of the disc such that there is provided a respective pad 22 associated with each piston/cylinder assembly 16,17, 18. Braking loads from the pads are transmitted to the caliper body 20.

Hydraulic brake actuating fluid is supplied to hydraulic connection 60 from a master cylinder (not shown) and hence to piston and cylinder assembly 16 in limb 11. Piston and cylinder assemblies 17 and 18 in limb 11 are interconnected with assembly 16 via passages in webs 61 and 62 in the limb. The piston and cylinder assemblies 16, 17 and 18 in limb are similarly interconnected with each other and are connected with the assemblies in limb 11 via an external brake pipe 63. Thus all the piston and cylinder assemblies are fed from connection 60. The piston and cylinder assemblies in limb 11 are provided with a bleed nipple 64 and the assemblies in limb 12 have a bleed nipple 65.

When the vehicle brakes are operated hydraulic pressure in the piston/cylinder assemblies 16,17,18 causes the pads to frictionally engage the brake disc (not shown). This causes a heat build up in the disc, and in extreme circumstances in the caliper body 20. In order to reduce the heat transfer to the hydraulic fluid in the caliper and hence prevent so called "Vapour Lock" that is brake failure due to boiling of the hydraulic fluid, cooling fluid passageways 23 are provided in the caliper body which are completely separate from the hydraulic brake fluid described above.

The cooling fluid passageways 23 are located in the caliper limbs 11 and 12 and surround at least a portion of the primary side walls of the hydraulic cylinders 16, 17 18.

The fluid passageway 23A in the limb 11 is connected to the fluid passageway 23B in the limb 12 by passageway 23C in the caliper bridge 14A. The cooling passageways 23 have a inlet port 24 on the limb 11 which allows cooling fluid (water) into the passageway 23A and the fluid then passes into the second caliper limb 12 via the passageway 2.3C, and leaves the second caliper limb 12 via a passageway 23D in the bridge 14B and finally passes through an exit port 25 on the first caliper limb 11 adjacent the inlet port. This ensures that cooling fluid has circulated through the entire caliper body. The direction of circulation could be reversed.

In order to assist the circulation, the cooling fluid may be pumped around the caliper by means of a pump 70 preferably an electrical pump, or by use of the vehicle engine coolant pump. Alternatively, the cooling may operate using a total loss system in which the cooling water is not recirculated but simply allowed to fall to the ground on leaving exit port 25.

It will also be appreciated that other cooling liquids could be used instead of water. For example, vehicle anti-freeze liquids could be used.

As can be best seen in FIG. 3, the cooling passageways 23 which are in the form of coolant galleries which weave around the side walls of the cylinders, passing over and under adjacent cylinders. This maximises the cooling area contact with the cylinders.

The caliper body 20 is assembled from-the two castings 11 and 12 one of which is also shown in cross-section in FIGS. 4 and 5.

The caliper parts 11 and 12 may be cast from a variety of materials such as cast iron or cast aluminium but the favoured material is Aluminium alloy grade LM25.

A number of casting processes can be used, but typically sand casting or gravity die casting techniques are favoured. The mould box for the casting is in two parts and may be in the form of a metal die, or a sand mould utilising a wood, metal or resin male pattern to produce the required mould cavity for each caliper part. The water galleries 23 in each part of the caliper are cast into the caliper by the use of a male core 50 (see FIG. 8) which is supported within female mould cavity during the casting process.

The core 50 is typically formed from a resin bonded silica sand using a core mould. The core may be produced by the so-called cold box technique in which a cold mould is filled with resin bonded sand and then heated to harden the resin.. This produces a solid core and is the favoured production technique for the core. Alternatively, the so-called hot box technique can be used in which resin bonded sand is blown onto a hot female mould so that is sets as it hits the mould. This provides a hollow core.

As can be seen from FIG. 7, the core 50 has typically four support pins 51 integrally formed in the core. The support pins 51 support the core 50 during the casting process in corresponding support pin "prints" formed in the main female mould cavity.

When the mould and core have been assembled for casting, the casting metal is poured into the void defined between the mould and core to cast a caliper part with an internal cooling gallery defined by core 50.

When the casting metal has solidified the cast caliper part is removed from the mould with the core 50 still in position. The core is removed by furnace heating the casting to break down the resin bonding of the sand so that at least some of the sand core can be poured out of the caliper. To ensure full removal of the complete core it is preferred that a chemical cleaning process be carried out. A suitable acidic or alkaline treatment such as high temperature sodium hydride (alkaline) wash can be used to fully dissolve and wash out all traces of the sand core.

Having removed the core, the caliper part 11, 12 is left with four holes 52 where the core support pins 51 once protruded (see FIG. 6), together with the hollow cooling gallery 23.

Holes 52 are used as the basis for defining the datum for the machining of caliper parts 11 and 12. Positioning probes 66 are introduced through holes 52 (see FIG. 6) to contact the internal surface of gallery 23 thus locating the caliper parts relative to the gallery and whilst the caliper parts 11 and 12 are located in this manner pilot datum bores are drilled in the inside face of each caliper part in positions co-axial with the intended outer bores 16 and 18 of each caliper part. These pilot datum bores are used as the subsequent locators of the castings during the subsequent machining of the castings. By accurately locating each casting relative to the actual position of its internal gallery it is possible to machine the bores 16,17 & 18 to produce thin walled cylinders separating the hydraulic actuation fluid and the coolant present in the galleries 23. This enables a high level of heat transfer to be achieved resulting in efficient cooling of the hydraulic fluid.

After the pilot datum bores are drilled the holes 52 are plugged to produce a fully enclosed gallery. Plugging may be achieved by means of mechanical screw-in or press-in plugs, but is preferred achieved by a welding process. In this process the core support holes are filled with a material similar to that from which the main body is cast, effectively extending the original casting walls.

Although the main objective of the present invention is to cool the hydraulic actuating fluid to avoid "Vapour Lock" due to boiling of the brake fluid, the cooling of the caliper also assists in preventing the seals of the piston and cylinder assemblies 16,17 and 18 being damaged by being overheated and also prevents damage to the aluminium caliper itself due to excessive caliper temperatures which can arise during heavy/prolonged braking.

I claim:

1. A disc brake caliper having two limbs which in use straddle a brake disc to support friction pads on each side of the brake disc for engagement with opposed sides of the disc, two or more hydraulic piston and cylinder assemblies in each limb of the caliper for operation of the caliper via a brake applying circuit, a cooling circuit separate from the brake applying circuit for the circulation of coolant within the caliper, the cooling circuit including an internal gallery in each limb of the caliper which at least partially encircles a cylinder of each assembly in the limb and the gallery in one limb being interconnected with the gallery in the other limb, and pumping means for circulating coolant around the separate cooling circuit which includes both galleries.

2. A disc brake caliper according to claim 1 in which each gallery weaves around the associated cylinders passing over and under adjacent cylinders.

3. A disc brake caliper according to claim 1 in which the two caliper limbs are joined by two circumferentially spaced bridges which pass over the outer periphery of the associated disc, and the galleries in the two limbs are interconnected by passage means in either or each bridge.

4. A disc brake caliper according to claim 1 in which one of the limbs has an inlet and an outlet for the interconnected coolant galleries.

\* \* \* \* \*